Nov. 19, 1963     J. E. FOLEY     3,111,083
DEVICE FOR HANDLING AND SQUEEZING SECTIONS OF FRUIT
Filed Dec. 3, 1962
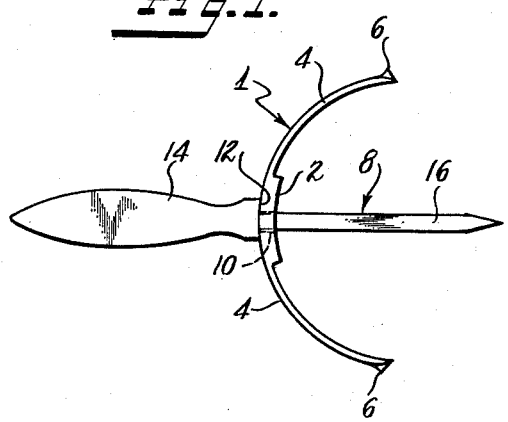
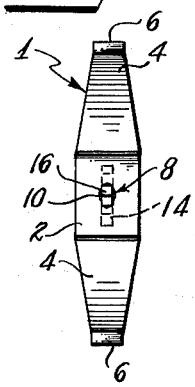
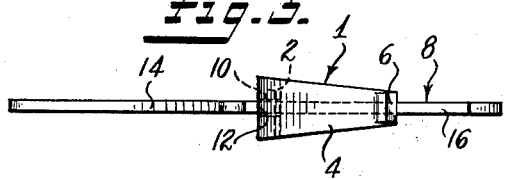
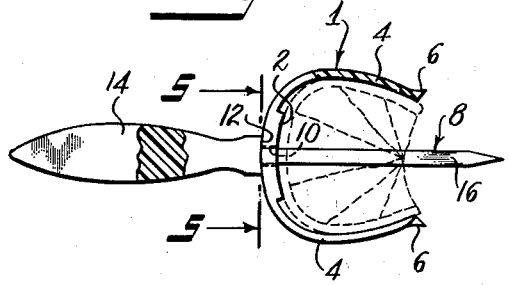
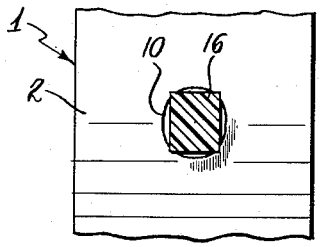
INVENTOR
Jessie E. Foley
BY
Bacon & Thomas
ATTORNEYS

United States Patent Office 3,111,083
Patented Nov. 19, 1963

3,111,083
DEVICE FOR HANDLING AND SQUEEZING SECTIONS OF FRUIT
Jessie E. Foley, Aiken, S.C.
(113 Southwick Drive, Windybush, Wilmington, Del.)
Filed Dec. 3, 1962, Ser. No. 241,984
3 Claims. (Cl. 100—235)

This invention relates to improvements in devices employed for handling and squeezing sections of fruit such as lemons, limes and the like.

Heretofore, squeezing devices of this nature have been formed from thin sheet metal and constructed so as to be flexed or pivoted only at the center portion thereof. These metal devices are of generally U-shaped configuration in cross-section and the portion of the arms between which a fruit section is gripped and squeezed are curved transversely of the length thereof, rendering them relatively inflexible. Such squeezing devices have not been found to be entirely satisfactory. Due to the shape of these metal devices and the inflexibility of the gripping portion, a section of fruit being squeezed tends to be forced off the spear and out from between the arms. In order to prevent this from happening, it has been necessary to provide projections or barbs on the inner surface of the gripping portions of the metal devices to bite into and hold the fruit sections in place. Also, since the metal gripping portions are relatively inflexible, they do not conform to the contour of the outer surface of the section of fruit as it is being squeezed and, therefore, it is not possible to apply a uniform pressure to all portions of the section of fruit in order to extract the maximum amount of juice. In addition, metal devices are easily distorted or bent out of shape and they are apt to become corroded or rusted. The disadvantages found in the prior squeezing devices are overcome by the present invention.

The present device is formed entirely of plastic material and includes a bow-shaped body portion, which is pliable except for a small, relatively stiff area at the center thereof, and a relatively rigid spear mounted in the center of the body portion and extending between the bowed side portions thereof.

It is one of the objects of the present invention to provide a device for squeezing fruit sections which is adapted to conform to the contour of the section of fruit as it is being squeezed for extracting all of the juice possible from all portions thereof.

Another object is to provide a device for handling and squeezing sections of fruit which is sufficiently flexible to adapt itself to the contour of the surface of the section of fruit being squeezed to prevent the section from being displaced from between the bowed portion when pressure is applied thereto.

A further object of the invention is to provide a device for handling and squeezing sections of fruit which is formed entirely of material which is not affected by fruit juices.

Another object is to provide a device for handling and squeezing sections of fruit which has a pleasing appearance and is economical to manufacture.

These and other objects and advantages of the invention will become apparent from the following specification when taken in conjunction with the drawings, in which:

FIG. 1 is a side plan view of the device for handling and squeezing sections of fruit;

FIG. 2 is a bottom plan view of the device shown in FIG. 1;

FIG. 3 is a side view of the device illustrated in FIGS. 1 and 2;

FIG. 4 is a side plan view, partially broken away, of the device with a section of fruit shown in phantom lines being gripped and squeezed therein; and FIG. 5 is an enlarged, fragmentary, sectional view of the device, taken on line 5—5 on FIG. 4, showing the frictional fit between the shaft of the rigid, plastic spear and the opening in the center of the strip of flexible plastic.

Referring now to the drawings, the bow-shaped body portion 1 of the present device for handling and squeezing sections of fruit is formed by molding suitable pliable and deformable plastic material having a degree of resiliency, such as polyethylene, to the desired configuration and thickness. The body portion 1 is in the form of an elongated strip with the center portion 2, disposed midway between the opposite ends thereof, formed to be thicker than the curved arm portions 4 which extend outwardly from the opposite sides thereof. The thicker center portion 2, which is rectangular in shape, is of sufficient thickness to be relatively nonflexible while the curved arm portions 4 are formed to be thinner than the center portion 2 and sufficiently pliable to assume the contour of the outer surface of a section of fruit and maintain it firmly in position as it is being squeezed.

As it is desirable to have the body portion 1 similar in shape to the fruit sections to be squeezed, the sides of the arms 4 are tapered so as to be narrower at the outer end than at the inner end where they join the thicker center portion 2. A small abutment 6 is formed on the outer surface at the outer end of each of the arms 4 in order to prevent the fingers of the person employing the device from slipping off the ends of the arms 4 when squeezing a section of fruit.

A spear 8, formed entirely of a relatively hard, substantially rigid, plastic material, such as polystyrene, extends through and is frictionally secured in a circular opening 10 formed at the center of body portion 1 in the thick, relatively nonflexible portion 2. The inner end 12 of the flat, oval-shaped head 14 of the spear 8 abuts against the outer surface of body portion 1 and provides a convenient finger grip for handling the device. The shaft 16 of the spear 8, which is employed for impaling and holding a section of fruit, extends between the curved arms 4 and is of rectangular shape as viewed in cross-section.

The relative size of the opening 10 formed at the center of body portion 1 and the portion of the shaft 16 of spear 8, which is confined in opening 10, is such that the opening is distorted by the shaft 16 and the plastic material in the thicker center portion 2 surrounding the opening is deformed whereby the shaft 16 of the spear 8 is frictionally gripped and maintained in position in the opening.

As shown in the drawings, the shaft 16 of spear 8 is of rectangular configuration and opening 10 in the center portion 2 is circular. The diagonal dimensions of the shaft 16 are slightly greater than the diameter of opening 10. Thus, when the shaft 16 of spear 8 is inserted into opening 10 in portion 2 to assemble the device, the corners of the shaft deform the opening and cause the resilient, plastic material to tightly grip the shank 16 and frictionally retain it in the opening by the inherent resiliency of the plastic material from which body portion 1 is formed. The spear may be removed from the opening in the strip and reinserted therein whenever desired by applying the required force to separate or assemble the parts. The frictional connection between the shaft of the spear and the resilient plastic material surrounding the opening, however, is sufficient to maintain the parts in the assembled relationship shown in the drawings during normal usage of the device.

It will be obvious that the shape of the shaft 16 could be square, triangular, or of any other noncircular configuration providing that the distance across the shaft is sufficient to engage and slightly deform the walls of opening 10. On the other hand, the shaft portion 16 of spear 8 could be of circular cross-section and the opening 10 could be of some noncircular configuration. It is desirable to maintain the cross-sectional area of the shaft 16 of the spear 8 slightly less than the area represented by opening 10 in order to keep deformation of the plastic material surrounding the opening at a minimum. While certain specific materials having desirable characteristics have been disclosed herein for the purpose of describing the preferred form of the invention, it is evident that other equally suitable materials may be employed.

When employing the present device to squeeze juice from a section of fruit impaled on the shaft 16 of the spear and confined between the arms 4, the pressure applied to the outer surface of arms 4 by the thumb and forefinger of the user causes the flexible arms to conform to the outer surface of the section of fruit and exerts a squeezing pressure on all portions of the section of fruit, extracting therefrom the maximum amount of juice. During the squeezing operation, the greatest pressure is first applied adjacent the outer ends of arms 4 which wrap partially beneath the section of fruit and approach the shaft 16 of spear 8, thus gripping the section of fruit and preventing it from slipping off the spear and out from between the arms of the device. The finger abutments 6 prevent the fingers from sliding off the ends of the arms 4. Because of the flexible, pliant nature of the material forming arms 4, the squeezing pressure is applied to a section of fruit in substantially the same manner it would be applied if the section of fruit were squeezed directly by the fingers.

The specific construction of the present invention as disclosed herein is for purpose of illustration only. It is obvious that certain alterations, modifications or equivalents will occur to those skilled in the art. Therefore, the scope of the appended claims is to be broadly construed within the light of the teaching of this invention.

I claim:
1. A device for handling and squeezing sections of fruit, comprising: a body portion of deformable, resilient, substantially rigid material having an opening formed therethrough; a curved, pliable arm formed integrally with said body portion extending outwardly and downwardly from opposite sides of said body portion for gripping and squeezing a section of fruit; a substantially rigid spear disposed in said opening and extending downwardly between said arms for impaling a section of fruit to be squeezed; the portion of said spear disposed in said opening being sufficiently larger in cross-section than the cross-section of said opening to distort said opening and to deform said material forming the wall of said opening, whereby said spear is frictionally gripped by said material and retained in position in said opening.

2. A device for handling and squeezing sections of fruit as defined in claim 1 in which a finger abutment is formed on the outer surface of each of said arms at the outer free end thereof.

3. A device for handling and squeezing sections of fruit, comprising: an integral bow-shaped, pliable, polyethylene strip having a circular opening formed therethrough midway between the opposite ends thereof; the portion of said strip surrounding said opening being of sufficient thickness to be relatively nonflexible; finger abutments formed on the outer surface of said strip at said opposite ends thereof; and a substantially rigid, polystyrene spear of rectangular configuration extending through said circular opening and between the sides of said bow-shaped strip, the relative size of the portion of said spear disposed in said opening and said opening being such that the corners of said spear distort said opening and deform said polyethylene whereby said spear is frictionally gripped and maintained in said opening, said spear having a head portion for handling the device abutting the outer surface of said strip.

References Cited in the file of this patent

UNITED STATES PATENTS

| | | |
|---|---|---|
| 913,365 | Doll | Feb. 23, 1909 |
| 1,756,250 | Kreuter | Apr. 29, 1930 |
| 2,001,290 | Thomson | May 14, 1935 |
| 2,800,408 | Fimple | July 23, 1957 |
| 2,826,388 | Janos et al. | Mar. 11, 1958 |
| 2,958,548 | De Vienne et al. | Nov. 1, 1960 |

FOREIGN PATENTS

| | | |
|---|---|---|
| 953,903 | France | May 30, 1949 |